Dec. 28, 1937. D. J. TINDALL 2,103,832
CORNER CLAMP FOR MITERED STORE FRONT CONSTRUCTIONS
Filed Oct. 13, 1936
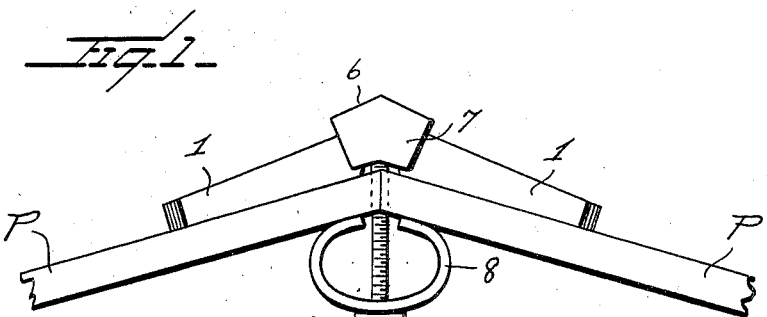
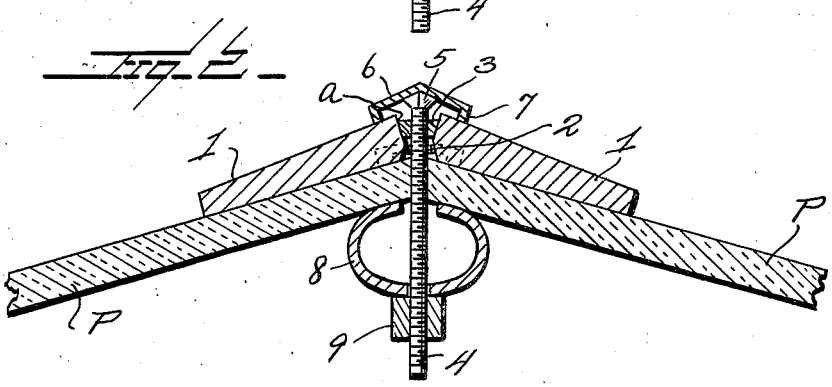
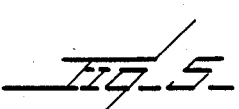
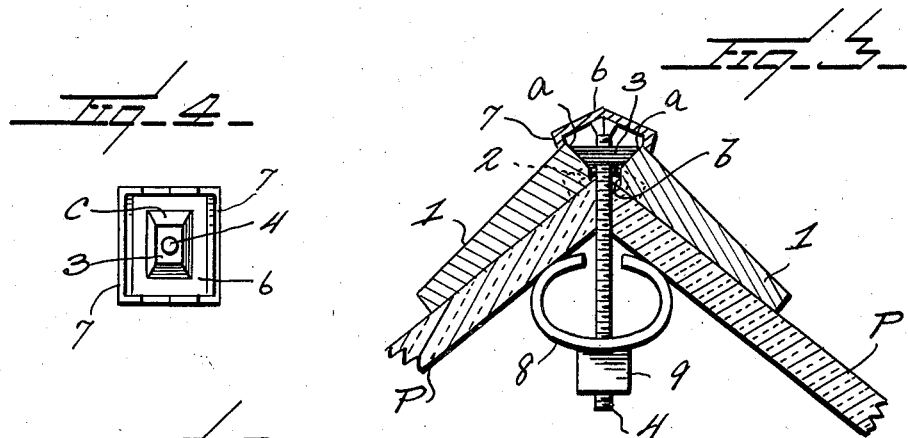
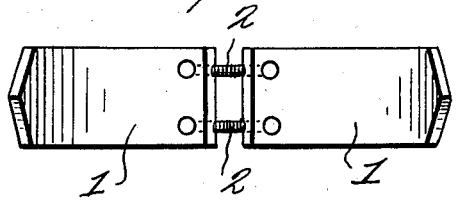
Inventor
*D. J. Tindall*
By *Watson E. Coleman*
Attorney Patented Dec. 28, 1937

2,103,832

UNITED STATES PATENT OFFICE 2,103,832

CORNER CLAMP FOR MITERED STORE FRONT CONSTRUCTIONS

Donald J. Tindall, Orlando, Fla.

Application October 13, 1936, Serial No. 105,418

5 Claims. (Cl. 189—78)

This invention relates to corner clamps for mitered store front contructions, and it is primarily an object of the invention to provide a clamp of this kind constructed and assembled in a manner whereby the same may readily and effectively adjust itself in accordance with differing angular relations of the panes or panels.

It is also an object of the invention to provide a clamp of this kind comprising clamping plates flexibly connected so that said plates may automatically adjust themselves in accordance with the angular relation of the panes or panels with which the plates engage, together with a clamping structure including a wedge member engaging between the opposed ends of the plates.

The invention also has for an object to provide a device of this kind which can be employed with equal facility in connection with panes or panels which may be in either obtuse or acute angular relation whereby the field of use of the clamp is materially enlarged.

The invention consists in the details of construction and in the combination and arrangement of the several parts of my improved corner clamp for a mitered store front construction whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view in top plan of a clamp constructed in accordance with an embodiment of my invention and in applied position upon panes or panels in obtuse angular relation;

Figure 2 is a sectional view taken lengthwise through the structure as illustrated in Figure 1;

Figure 3 is a sectional view somewhat similar to Figure 2 but showing the clamp applied to panes or panels in obtuse angular relation;

Figure 4 is a view in bottom plan of the screw and applied wedge member as herein embodied;

Figure 5 is a view in bottom plan of the clamping plates unapplied.

As disclosed in the accompanying drawing, my improved corner clamp construction comprises two clamping plates 1 of desired dimensions and which are arranged in alignment with adjacent ends in spaced relation. The faces $a$ of the adjacent or opposed ends of the plates 1 for a major portion thereacross are substantially at right angles to the longitudinal axes of the plates 1 with the inner corners of such faces $a$ cut away, as at $b$, to facilitate the desired angular adjustment or arrangement of the plates 1.

The lower portions of the opposed faces $a$ of the plates 1 are connected by the transversely spaced flexible members 2 preferably coil springs, the extremities of said members 2 being securely anchored to the plates 1 in any preferred manner. The outer or upper portions of the faces $a$ of the plates 1 when said plates are in position against or in contact with the corner portions of adjacent panes or panels P, provide cam surfaces with which directly engage the opposed cam faces $c$ of the wedge member or block 3. It will be noted that this member is of a greater length in one direction than the other so that by proper adjustment of the block 3 the clamp may be used with equal facility in connection with a structure wherein the adjacent panes or panels P are on an obtuse angle as illustrated in Figure 1 or 2 or when said panes or panels P are disposed on an obtuse angle as illustrated in Figure 3.

Threading through the axial center of the block 3 is an elongated screw 4 which passes in a well known manner between the adjacent edge faces of the panes or panels P, and the outer extremity of this screw 4 is welded, as at 5, or otherwise fixedly and rigidly secured to the central portion of a cap 6. This cap 6 is of desired dimensions and has side flanges 7 extending inwardly of the screw 4 for direct contact with the outer faces of the plates 1 at a point closely adjacent to the opposed faces $a$. Each end of the cap 6 is formed with an inwardly disposed flange 7 of a length to lap the side faces of the adjacent ends of the plates 1 whereby the maintenance of the plates 1 in desired assembled relation is assured without hindrance or obstruction to the relative adjustment of the plates 1 to compensate for the variation in angular relation of the panes or panels P to which the plates 1 may be applied.

Contacting with the inner faces of the panes or panels P are the extremities of a substantially C-shaped spring member 8. The screw 4 is directed between the free extremities of this spring 8 and also freely disposed, through the central portion of the spring. The screw 4 outwardly of the spring 8 has threaded thereon a nut 9. By proper tightening of the nut 9 the clamp structure is effectively maintained in applied working position, the spring 8 providing means to permit automatic compensation for such expansion or contraction as may result from climatic changes.

In the accompanying drawing it is to be noted that the flanges 7 are of such dimensions as to bridge the space between the opposed faces a and to closely approach the side faces of the plates 1.

From the foregoing description it is thought to be obvious that a corner clamp for mitered store front construction constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A corner clamp for store front construction comprising two clamping plates substantially in endwise alignment with opposed end faces in spaced relation, a flexible connecting means between the opposed portions of the plates, a screw carrying a cap, a wedge member carried by the screw for engagement between the opposed faces of the clamping plates, and clamping means carried by the screw for coaction with the plates.

2. A corner clamp for store front construction comprising two clamping plates substantially in endwise alignment with opposed end faces in spaced relation, a flexible connecting means between the opposed portions of the plates, a screw carrying a cap, a wedge member carried by the screw for engagement between the opposed faces of the clamping plates, and clamping means carried by the screw for coaction with the plates, said wedge member being of greater length in one direction than the other.

3. A corner clamp for store front construction comprising two clamping plates substantially in endwise alignment with opposed end faces in spaced relation, a coil spring connecting adjacent portions of the plates, a screw carrying a cap, a wedge member carried by the screw for engagement between the opposed faces of the clamping plates, and clamping means carried by the screw for coaction with the plates.

4. A corner clamp for store front construction comprising two clamping plates substantially in endwise alignment with opposed end faces in spaced relation, a flexible connecting means between the opposed portions of the plates, a screw carrying a cap, a wedge member carried by the screw for engagement between the opposed faces of the clamping plates, and clamping means carried by the screw for coaction with the plates, the cap carried by the screw having contact with the outer faces of the plates at the adjacent extremities thereof.

5. A corner clamp for store front construction comprising two clamping plates substantially in endwise alignment with opposed end faces in spaced relation, a flexible connecting means between the opposed portions of the plates, a screw carrying a cap, a wedge member carried by the screw for engagement between the opposed faces of the clamping plates, and clamping means carried by the screw for coaction with the plates, the cap carried by the screw having contact with the outer faces of the plates at the adjacent extremities thereof, said cap having flanges bridging the space between the plates and overlying and closely approaching the side faces of the plates.

DONALD J. TINDALL.